Patented Nov. 22, 1938

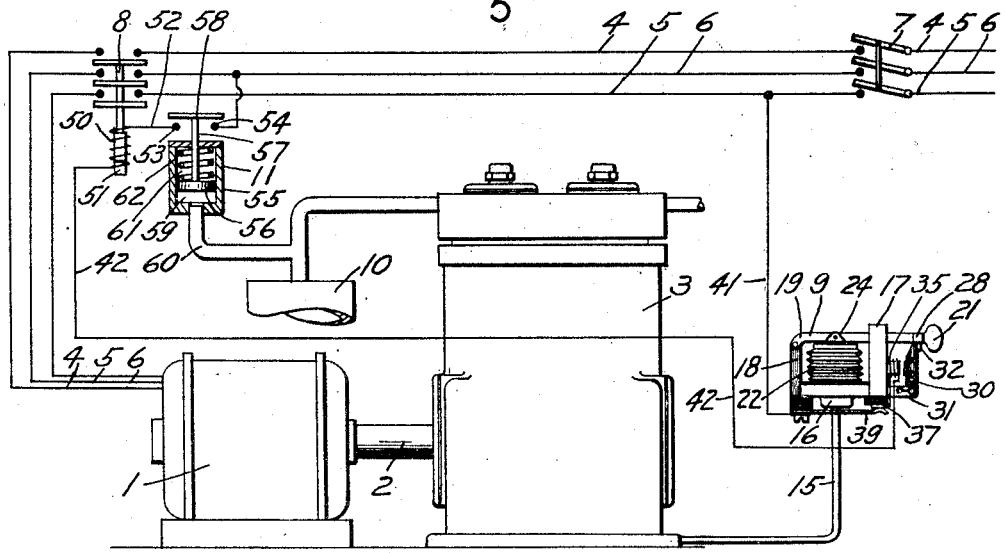

2,137,221

UNITED STATES PATENT OFFICE 2,137,221

MOTOR PROTECTION DEVICE

Burton S. Aikman, Wilkinsburg, Pa., assignor to The Westinghouse Air Brake Company, Wilmerding, Pa., a corporation of Pennsylvania Application January 13, 1937, Serial No. 120,377

7 Claims. (Cl. 230—6)

This invention relates to electric motor driven apparatus, and more particularly to that type of apparatus in which the motor circuit is automatically opened when the driving motor is operated at too slow a speed or stalls, a fluid compressing apparatus being one instance of such apparatus.

In electric motor driven apparatus it is necessary to safeguard the electric motor against damage due to excessively high temperatures incident to stalling and it is equally as important to protect the driven portion of the apparatus against undue wear or damage due to insufficient lubrication of the moving parts thereof in the event of the failure to maintain a high enough pressure in the lubricating system to insure adequate lubrication of the mechanism.

The principal object of the present invention is to provide an improved automatically operable means for opening the electric motor circuit of a motor driven apparatus when the motor is operating at too slow a speed or stalls.

Another object of the invention is to provide automatically operable means for opening the electric motor circuit of a motor driven apparatus when, with the apparatus in operation, the pressure of oil in the lubricating system is below that required to properly lubricate the moving parts of the apparatus.

These objects I attain by means of a control system including a control device which operates according to the pressure of oil in the lubricating system of the apparatus for controlling the operation of the electric motor circuit control switch.

Other objects and advantages will appear in the following more detailed description of the invention.

In the accompanying drawing, Fig. 1 is a diagrammatic elevational view of an electric motor driven apparatus embodying the invention, several of the parts of the apparatus being shown in section; Fig. 2 is an enlarged fragmentary detail sectional view of the same; Fig. 3 is a detail sectional view taken on the line 3—3 of Fig. 2, and Fig. 4 is a fragmentary sectional view illustrating a portion of a control switch device in the position it assumes when the pressure in the lubricating system is high enough to provide adequate lubrication.

In the drawing, the invention has been shown in connection with a fluid compressor, but this has been done for illustrative purposes only, for I contemplate its use in connection with other types of apparatus having pressure lubricating systems.

As shown, the apparatus may comprise an electrically operated driving motor 1 having a driving connection with the crank shaft 2 of a fluid compressor 3, and may also comprise motor circuit wires 4, 5 and 6, a master switch device 7 which is manually operable to selectively open or close the motor circuit, an electrically controlled switch device 8 which is operable to open and close the motor circuit only when the master switch device is in circuit closing position, a fluid pressure responsive control switch device 9 for controlling the operation of the switch device 8, a fluid pressure storage reservoir 10 and a fluid pressure control switch device 11 for also controlling the operation of the switch device 8.

The compressor shown is of the usual well known type having a casing in which there is rotatably mounted in suitable bearings the crank shaft 2 for operating connecting rods 12 which are operatively connected in the usual manner at their upper ends to fluid compressing pistons, not shown, and also having a pressure lubricating system which is indicated by the reference character 13 and which differs from the usual type of systems in that it includes a pressure control passage 14 which is connected by a pipe 16 to a control chamber of the switch device 9 as will hereinafter more fully appear, said passage having interposed therein a choke plug 65.

The pressure responsive control switch device 9 comprises a frame having a base portion 16 which is provided with spaced upwardly extending lugs 17 and 18. This frame may be secured in any desired manner to any suitable supporting structure and is preferably located as close to the compressor as practicable.

Pivotally mounted on the lug 18 to swing back and forth relative to the base portion 16 is an arm 19 which extends across the space between the lugs 17 and 18 and through an opening 20 in the lug 17 and which, at its outer end, is provided with a handle or knob 21 for use when it is necessary to manually operate the arm.

Located between the lugs 17 and 18 and secured in any desired manner, such as by welding or soldering, to the base portion 16 in air tight relationship therewith is a flexible diaphragm 22 preferably of the bellows type having a follower plate 23 soldered or otherwise secured to the outer end thereof. This follower plate is provided with spaced lugs 24 which overlap the sides of the arm 19 and which are pivotally connected to the lever by means of a pin 25. The follower plate is also provided with an inwardly extending lug 26 to which, interiorly of the diaphragm, is secured one end of a control coil spring 27. The other end of the spring is secured to the base plate 16.

The arm 9, adjacent the knob 21, is provided with a thickened portion 28 in which there is formed a recess 29 for the reception of the outer end of a latch or strut 30 which is pivotally mounted on a lug 31 and which extends outwardly at right angles to the lug 17. The thickened portion extends only a short distance to the left of the recess 29 so that, as will hereinafter more fully appear, the latch 30, upon a slight movement in a counterclockwise direction, will clear the arm. At the right hand side of the recess 29 the thickened portion 28 is provided with a stop lug 32 which is adapted to engage the latch 30 and thereby limit its movement in a clockwise direction by the action of a spring 33 which cooperates with the latch and the lug 31 and which at all times tends to move the latch in this direction.

Located between the arm 9 and the lug 31 and carried by the lug 17 is an electro-magnet which may comprise a core 34 and a coil or winding 35 surrounding the core, which magnet when energized is adapted to attract the latch to it and thereby cause the latch to move in a counterclockwise direction against the opposing action of the spring 33, provided the arm 9 is out of holding or locking engagement with the latch as shown in Fig. 4 at the time of energization of the magnet. One end of the magnet winding 35 is connected by means of a wire 36 to a metallic contact plate 37 which is carried by the base portion 16, there being a section 38 of insulating material interposed between the contact plate and the base portion. The contact plate is adapted to be engaged by one end of a spring contact member 39 which member at its other end is rigidly secured to a section 40 of insulating material carried by the base portion 16. This latter end of the contact plate is connected by means of a wire 41 to the electric motor circuit wire 5 at a point between the switch devices 7 and 8. The other terminal of the magnet winding 35 is connected to a wire 42 which leads to the switch device 8.

The contact end of the contact arm 39 is engaged by one end of a plunger 44 which is made of insulating material and which is slidably mounted in the lug 17, insulating section 38 and contact plate 37 for actuating the contact arm. The other end of the plunger extends into the opening 20 and is adapted to be operatively engaged by the arm 19 as will hereinafter more fully appear.

The diaphragm 22 and the base portion 16 define a chamber 45 which is connected to the pipe 15 by way of a check valve chamber 46 and a ball check valve 47 which is adapted to engage a valve seat 48 in the base portion, said seat 48 having a leakage groove 49 of small flow area formed therein establishing communication from the check valve chamber 46 and thereby the chamber 45 to the pipe 15 of the pressure lubricating system.

The electric switch device 8 may comprise a solenoid having a magnet winding 50 and a movable core 51 adapted to actuate switch arms to either open or close the motor circuit. One terminal of the winding is connected to the wire 42 and the other terminal is connected to a wire 52 which in turn is connected to a contact 53 of the switch device 11. The other contact 54 of the switch device 11 is connected by wire to the motor circuit wire 6 at a point intermediate the switch devices 7 and 8.

The switch device 11 may comprise a cylinder 55 in which there is slidably mounted a piston 56 having a stem 57 adapted to operate a contact arm 58 either into or out of engagement with the contacts 53 and 54. At one side of the piston 56 is a chamber 59 which is connected through a pipe 60 to the reservoir 10 and at the other side there is a chamber 61 containing a control spring 62 which is adapted to act to move the piston to its circuit closing position when the fluid pressure in chamber 59 is reduced to a predetermined degree.

In operation, assuming that the apparatus is to be initially charged with fluid under pressure, the operator first makes sure that the arm 19 is in position locking the latch 30 in its lever supporting position, and then moves the switch device 7 to its circuit closing position. Since the reservoir 10 is at atmospheric pressure the spring 62 of the switch device 11, acting through the medium of the piston 56 and stem 57, maintains the switch contact arm 58 in engagement with the switch contacts 53 and 54, so that when the switch device 7 is moved to its circuit closing position, the circuit through the windings 50 and 35 of the switch devices 8 and 9, respectively, is closed. The action of the winding 50, due to the flow of current therethrough, causes the movable core 51 to operate to move the switch arms carried thereby to close the motor circuit through the motor 1. The motor and thereby the compressor is thus set in operation. It will here be noted that upon the energization of the winding 35 of the switch device 9, the latch 30 will be maintained locked in its lever supporting position by the lever.

Since the compressor 3 is now being driven by the motor, the pressure of oil in the lubricating system is increased in the usual manner and further, since the passage 14 is in communication with the lubricating system by way of the choke plug 65 and is also in communication with the diaphragm chamber 45 by way of pipe 15, ball check valve 47 and check valve chamber 46, the pressure in the chamber 45 will be substantially that of the pressure lubricating system. The choke plug 65 is provided for the purpose of so restricting the flow of oil to the passage 14, pipe 15 and chamber 45 that such flow will not act to delay the build-up of the desired pressure in the lubricating system.

Now when the pressure of fluid in the diaphragm chamber has been increased to substantially the pressure required in the lubricating system to insure the proper lubrication of the moving parts of the compressor, the diaphragm 22 is caused to flex outwardly against the opposing action of the spring 27, the diaphragm, as it is thus flexing, moving the arm 19 out of locking engagement with the latch 30. Since, as before mentioned, the winding 35 is energized, the latch 30 is attracted to the core 34 against the opposing action of the spring 33. With the latch 30 in engagement with the core 34, the upper end of the latch is out of the path of travel of the thickened portion 28 of the arm 19, so that as will hereinafter more fully appear, the arm is adapted to move downwardly and actuate the plunger 44 and thereby the contact member 39 to break the circuit through the windings 35 and 50 in the event of the pressure of the lubricant reducing to a dangerously low point.

Now when the reservoir 10 is charged with fluid to the desired pressure, the piston 56 of the switch device 11 is caused to move upwardly against the opposing action of the spring 62, causing the contact arm 58 to move out of contact with the switch contacts 53 and 54, thereby opening the circuit through the windings 50 and 35 of the switch devices 8 and 9, respectively, thus effecting the deenergization of the windings. With the winding 35 deenergized the spring 33 acts to move the latch 30 outwardly from engagement with the core to its supporting position, the movement of the latch in this direction being limited by the stop 32 on the arm 19 as shown in Fig. 4. Upon deenergization of the winding 50 the core 51 and switch arms carried thereby are moved downwardly by the force of gravity to open the motor circuit, and as a consequence the motor and thereby the compressor come to a stop.

As the compressor is coming to a stop, the pressure of oil in the lubricating system thereof decreases at a fairly rapid rate but the resulting reduction in the pressure of fluid in the diaphragm chamber 45 will be at a slower rate as regulated by the flow area of the leakage groove 49, the ball check valve 47 having been previously moved to its engagement with the valve seat 48 upon the equalization of the pressures in the pipe 15 and chamber 45, thus rendering the leakage groove 49 effective to control the rate of reduction in the pressure of fluid in chamber 45. The purpose of retarding the rate of reduction in the pressure of fluid in chamber 45 is to provide sufficient time for the latch 30 to assume its supporting position before the arm 19 can move downwardly and prevent it from moving to this position. As the pressure of fluid in diaphragm chamber 45 is decreased the spring 27 acts to move the arm 19 downwardly until it is brought to a stop by the latch 30 in the position in which it is shown in Fig. 2. It will be noted that with the latch 30 in supporting engagement with the arm 19, said arm will not engage the plunger 44, so that the contact member 39 remains in its circuit closing position as shown in Figs. 1 and 2.

When, due to the use of fluid stored in the reservoir 10 or due to leakage therefrom, the pressure in the reservoir and consequently in the piston 9 of the switch device 11 is reduced below the value of the spring 62, said spring acts through the medium of the piston 56 and piston stem 57 to move the contact arm 58 into engagement with the switch contacts 53 and 54, thereby closing the circuit through the windings 50 and 35, whereupon said windings are again energized. The energized winding 50 causes the switch device 8 to function to again close the circuit through the motor. Since the latch 30 is locked in supporting position by the arm 19 it cannot be moved out of such position until the lever is again moved to its unlocking position by the pressure of fluid controlled by the lubricating system as will be apparent from the foregoing description.

If for any reason, such as the slowing up of the motor 1 or a fault in the lubricating system, the lubricant cannot be maintained at a pressure sufficient to insure the proper lubrication of the moving parts of the compressor, the spring 27 will act to move the arm 19 inwardly, and since the latch 30 by reason of the action of the energized winding 35 and core 34, will be held out of the path of travel of the enlarged portion 28 of the arm, the arm will engage the plunger 44 and move it inwardly. The plunger as it is thus moved forces the contact member 39 out of engagement with the contact plate 37 and thereby opens the circuit through the windings 50 and 35 with the result that both windings are deenergized. The deenergization of the winding 50 causes the switch device 8 to function to open the electric circuit through the motor 1 so that the motor and thereby the compressor is brought to a stop regardless of the pressure in the reservoir 10. Upon the deenergization of the winding 35 in the manner just described the latch 30 will be maintained out of its supporting position by the engagement of the left hand end of the thickened portion 28 of the lever as will be apparent.

The position of the arm 19 and latch 30 will indicate to an operator that there is a defect in the apparatus which must be repaired before it is safe to again attempt to set the apparatus in operation.

After the necessary repairs have been made, the operator must reset the switch device 9 before the apparatus can be again put in operation. To accomplish this he must move the arm 19 outwardly a sufficient distance to permit the latch 30 to assume its supporting position and then release the arm so that it will be moved by the action of the spring 27 into locking engagement with the latch. As the lever is thus moved manually to its outermost position, the spring contact member 39 moves into engagement with the contact plate 37 and at the same time moves the plunger 44 to its normal position as shown in Fig. 2. Now if the switch devices 7 and 11 are in their circuit closing positions the circuit through the windings 50 and 35 will be closed and said windings energized, the energization of the winding 50 causing the switch device 8 to function to close the circuit through the motor 1. The operation and control of the apparatus will now be the same as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid compressing apparatus, in combination, an electric motor, an electric circuit for supplying current to said motor, a magnet switch device operative upon energization for closing the circuit through said motor and operative upon deenergization for breaking the circuit through the motor, an electric circuit for said magnet switch device, a fluid compressor adapted to be driven by said motor, a pressure lubricating system for the compressor, two control switch devices operative to control the circuit for the magnet switch device, one of said control switch devices being operative to its circuit breaking position upon a predetermined increase in the pressure of fluid compressed by the compressor and operative to its circuit closing position upon a predetermined reduction in the compressed fluid, and the other of said control switch devices being operative upon a predetermined decrease in the pressure of the lubricating system for breaking the circuit through the magnet switch device, and means for locking the control switch device which is subject to the pressure of the lubricating system in its circuit closing position when the circuit through the magnet switch device is broken by the operation of the other control switch device, the locking means being movable manually to its circuit closing position in the absence of pressure in the lubricating system.

2. In a fluid compressing apparatus, in combination, an electric motor, an electric circuit for supplying current to said motor, a magnet switch device operative upon energization for closing the circuit through said motor and operative upon deenergization for breaking the circuit through the motor, an electric circuit for said magnet switch device, a fluid compressor adapted to be driven by said motor, a pressure lubricating system for the compressor, two control switch devices operative to control the circuit for the magnet switch device, one of said control switch devices being operative to its circuit breaking position upon a predetermined increase in the pressure of fluid compressed by the compressor and operative to its circuit closing position upon a predetermined reduction in the compressed fluid, and the other of said control switch devices being operative upon a predetermined decrease in the pressure of the lubricating system for breaking the circuit through the magnet switch device, and means operative upon the breaking of the circuit through the magnet switch device by the first mentioned control switch device for locking the other control switch device from operating to its circuit breaking position, said means being operative manually to its circuit closing position in the absence of pressure in the lubricating system.

3. In a fluid compressing apparatus, in combination, an electric motor, an electric circuit for supplying current to said motor, a magnet switch device operative upon energization for closing the circuit through said motor and operative upon deenergization for breaking the circuit through the motor, an electric circuit for said magnet switch device, a fluid compressor adapted to be driven by said motor, a pressure lubricating system for the compressor, two control switch devices operative to control the circuit for the magnet switch device, one of said control switch devices being operative to its circuit breaking position upon a predetermined increase in the pressure of fluid compressed by the compressor and operative to its circuit closing position upon a predetermined reduction in the compressed fluid, and the other of said control switch devices being operative upon a predetermined decrease in the pressure of the lubricating system for breaking the circuit through the magnet switch device, and means operative upon the breaking of the circuit through the magnet switch device by the first mentioned control switch device for locking the other control switch device against operation to its circuit breaking position, said other control switch device being operative manually to its circuit closing position in the absence of pressure in the lubricating system.

4. In a fluid compressing apparatus, in combination, an electric motor, an electric circuit for supplying current to said motor, a magnet switch device operative upon energization for closing the circuit through the motor and operative upon deenergization for breaking the circuit through the motor, an electric circuit for said magnet switch device, a fluid compressor adapted to be driven by said motor, a pressure lubricating system for the compressor, two control switch devices operative to control the circuit for the magnet switch device, one of said control switch devices being operative to its circuit breaking position upon a predetermined increase in the pressure of fluid compressed by the compressor and operative to its circuit closing position upon a predetermined reduction in the compressed fluid, and the other of said control switch devices being operative upon a predetermined decrease in the pressure of the lubricating system for breaking the circuit through the magnet switch device, and means operative upon the breaking of the circuit through the magnet switch device by the first mentioned control switch device for locking the other control switch device against operation to its circuit breaking position, said means being automatically movable to its unlocking position upon the desired increase in the pressure of the lubricating system when the circuit through the magnet switch device is closed by the first mentioned control switch device, said arm being operable manually to effect the operation of said switch to close said circuit in the absence of said one pressure.

5. In a pressure controlled switch device, in combination, a casing, an electromagnet carried by said casing, an electric circuit for supplying current to said electromagnet, a switch carried by said casing and operative to either open or close said circuit, an arm pivotally carried by said casing for actuating said switch, means subject to opposing pressures and operable upon a reduction in one of said pressures for moving said arm in a direction to actuate said switch to open said circuit, a latch normally positioned in the path of travel of said arm and operative by the magnetic force of the electromagnet upon the energization of the magnet to a position out of the path of travel of the arm.

6. In a fluid compressing apparatus, in combination, a fluid compressor, a pressure lubricating system for the compressor, an electric motor for driving said compressor, an electric circuit for supplying current to said motor, a magnet switch device operative upon energization to close the circuit to said motor and operative upon deenergization to open the circuit to said motor, a circuit for supplying current to said magnet switch device, a switch device subject to variations in the pressure of fluid compressed by the compressor for normally opening and closing the circuit to said magnet switch device, and a control switch device subject to the pressure of the lubricating system and operative upon a decrease in the pressure of the lubricating system, while the circuit to the magnet switch device is closed, to open the circuit to the magnet switch device, said control switch device comprising a casing, a switch carried by the casing and adapted to control the circuit to the magnet switch device, means subject to variations in the pressure of the lubricating system for actuating said switch, an electromagnet having a winding included in the circuit for the magnet switch device adapted to be energized upon the closing of the circuit, a latch normally in a position to prevent the operation of said means to actuate the control switch to its circuit opening position and movable out of said position by the force of said electromagnet upon energization thereof, said means being movable manually to effect the operation of the control switch to its circuit closing position in the absence of pressure in the lubricating system.

7. In a fluid compressing apparatus, in combination, a fluid compressor, a pressure lubricating system for the compressor, an electric motor for driving said compressor, an electric circuit for supplying current to said motor, a magnet switch device operative upon energization to close the circuit to said motor and operative upon deenergization to open the circuit to said motor, a circuit for supplying current to said magnet switch device, a switch device subject to variations in the pressure of fluid compressed by the compressor for normally opening and closing the circuit to said magnet switch device, and a control switch device subject to the pressure of the lubricating system and operative upon a decrease in the pressure of the lubricating system, while the circuit to the magnet switch device is closed, to open the circuit to the magnet switch device, said control switch device comprising a casing, a switch carried by the casing and adapted to control the circuit to the magnet switch device, means subject to variations in the pressure lubricating system for actuating said switch, an electromagnet having a winding included in the circuit for the magnet switch device adapted to be energized upon the closing of the circuit, a latch normally in a position to prevent the operation of said means to actuate the control switch to its circuit opening position and movable out of said position by the force of said electromagnet upon energization thereof, means for retarding the movement of said means in the switch operating direction, and means operative upon the deenergization of said electromagnet to return said latch to its normal position provided said means has not previously moved into the path of travel of the latch, said means being operative manually for effecting the operation of the control switch device to its circuit closing position in the absence of pressure in the lubricating system.

BURTON S. AIKMAN.

CERTIFICATE OF CORRECTION.

Patent No. 2,137,221. November 22, 1938.

BURTON S. AIKMAN.

It is hereby certified that error appears in the printed specification of the above numbered patent requiring correction as follows: Page 4, second column, lines 16 to 19 inclusive, claim 4, after the word and comma "device," strike out said arm being operable manually to effect the operation of said switch to close said circuit in the absence of said one pressure" and insert instead and being movable manually to its circuit closing position in the absence of pressure in the lubricating system; line 34, claim 5, after "arm" and before the period, insert the comma and words , said arm being operable manually to effect the operation of said switch to close said circuit in the absence of said one pressure; and that the said Letters Patent should be read with this correction therein that the same may conform to the record of the case in the Patent Office.

Signed and sealed this 31st day of October, A. D. 1939.

(Seal)

Henry Van Arsdale,
Acting Commissioner of Patents.